(12) United States Patent
Moore et al.

(10) Patent No.: US 6,278,607 B1
(45) Date of Patent: *Aug. 21, 2001

(54) SMART BI-METALLIC HEAT SPREADER

(75) Inventors: Andrew Moore; David Moss, both of Austin, TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,930

(22) Filed: Aug. 6, 1998

(51) Int. Cl.$^7$ ........................................................ G06F 1/16
(52) U.S. Cl. .................... 361/687; 361/688; 361/690; 361/702; 361/703; 361/704; 361/709; 361/710; 361/711
(58) Field of Search ................................ 361/687, 688, 361/690, 702–704, 709–711; 174/16.3; 165/80.3, 185

(56) References Cited

U.S. PATENT DOCUMENTS

| | | | |
|---|---|---|---|
| 5,107,330 | * | 4/1992 | Dahringer ............................... 357/81 |
| 5,469,329 | | 11/1995 | Reddy et al. . |
| 5,552,960 | * | 9/1996 | Nelson et al. ....................... 361/687 |

* cited by examiner

*Primary Examiner*—Gerald Tolin
*Assistant Examiner*—Yean-Hsi Chang
(74) *Attorney, Agent, or Firm*—Haynes and Boone, L.L.P.

(57) ABSTRACT

A variable area heat sink has a first heat sink area and a second heat sink area. A bridge is connected to the first heat sink area and includes a bi-metallic portion operable to connect and disconnect with the second heat sink area in response to a temperature change in the bridge which is sufficient to distort the bi-metallic portion from a first shape to a second shape. The first heat sink area may be installed in a computer chassis adjacent a first heat producing component. The second heat sink area may be installed in the chassis adjacent a second heat producing component. The combination of heat sink areas may be enlarged or reduced in size due to the coupling or uncoupling.

15 Claims, 2 Drawing Sheets

SMART BI-METALLIC HEAT SPREADER

BACKGROUND

The disclosures herein relate generally to heat transfer and more particularly to a thermally activated device for coupling and decoupling heat sinks, especially those used in electronic devices contained in computer systems.

A portable computer is a self-contained personal computer which can be easily moved to and operated at various locations. Portable computers are often referred to as laptop or notebook computers. To be portable, these computers must be small, compact, and lightweight. The conventional portable computer includes a base portion and a lid portion that pivotally opens from the base portion when the portable computer is in use. The lid portion contains a flat panel display such as a liquid crystal display (LCD) or other relatively small display. Notebook computers incorporate electromagnetic shielding to reduce electromagnetic emissions in order to meet regulatory standards on such emissions.

Portable computers also use thermal transfer mechanisms to cool the central processing unit (CPU) which accounts for as much as half of the power dissipated within the computer system and other thermally sensitive components such as PC cards and SDRAM. In the past, heat spreaders, heat sinks, heat pipes, and fans have been used to address the heat transfer problem. One type of heat spreader is a metal piece that is thermally coupled to a processor and distributes heat away from the processor. Typically, a heat sink is made of relatively pure aluminum for good thermal conductivity and for reduced weight. However, because aluminum is a relatively soft metal with a low yield strength, it makes for a poor electromagnetic shield. Furthermore, oxide coatings typically form on the outside of items made of aluminum which reduces the ability of the object to provide low impedance electrical connections with other items in contact with the aluminum material. Because heat spreaders typically serve only one function, heat spreaders add extra pieces to the computer system assembly as well as increasing the complexity of the build and repair operations.

Fans and heat sinks provide a cost effective mechanism for thermally managing many types of portable computer systems. Fans, however, require power and heat sinks require space. While power and space are generally in abundant supply in desktop-type minicomputers, portable computers have only a limited supply of both power and space. A commercial advantage is achieved by manufacturing portable computers that are both small and lightweight. Further, portable computers must operate with power conservation in mind. An operable fan may unduly draw upon the batteries of a laptop making it unattractive for long periods of battery-operated use.

Heat pipes are self contained, phase transformation, heat carrying devices, i.e. a superconductor of heat. A typical heat pipe may comprise a closed copper tube having a partial vacuum internally. Water in a hot portion of the tube boils at a lower than usual temperature in the partial vacuum. The boiling water seeks a cooler spot and thus steam moves to carry heat to the cooler spot where the steam condenses to cooler water which returns to the hot spot. The cycle is ongoing which provides a self-contained circulating cooling system.

Computer chassis contain many heat producing components. The heat must be removed from the computer chassis. Some of these components can operate adequately at higher temperatures than others. Therefore, it is not necessary to remove the same quantity of heat from all components. For example, a PC card may have an operating limit of 55° C. at 3 watts, and a CPU may have an operating limit of 100° C. at 12 watts. Also, a palm rest area of a portable computer may become uncomfortable to the touch of the operator if the temperature of the palm rest exceeds 45° C.

A bimetallic heat spreader has been described in U.S. Pat. No. 5,469,329. In this device, semiconductor dies and other electronic devices may be mounted directly on a heat spreader made of copper so that the electronic devices are capable of transmitting heat directly to the copper, although they are indirectly supported by the circuit board that serves as a carrier for the electronic devices. The heat may be transferred directly from the electronic devices to a heat sink through the heat spreader. Thermal resistance in the transfer of thermal energy to the heat sink thus is minimized.

Differences in the coefficients of thermal expansion of the copper of the heat spreader and the substrate of the electronic device, such as a power die, are accounted for by using a metal layer of Invar within the heat spreader in the localized area on which the electronic device is mounted. The Invar, which is characterized by very low thermal conductivity, does not interfere with the heat transfer because it is remote from the heat flow path. The silicon die, which is a poor thermally conductive material having a low coefficient of thermal expansion, then can be bonded to the localized area of the copper heat spreader without being adversely affected by differences in the thermal coefficients of expansion of the copper and the silicon. The bonding may involve the use of solder metal or conductive epoxies.

A secure bond can be achieved between the die and the heat spreader without resorting to conventional plastic encapsulating techniques that have been used in the manufacture of prior art wiring board assemblies to minimize a thermal mismatch between the heat spreader and the die. Thus, the die or other electronic device that is attached to the heat spreader can be operated at a higher power level without adversely affecting its reliability due to the presence of operating temperatures within safe operating junction temperature limits.

The heat spreader itself can be attached to the printed wiring board at pre-cut locations and made an integral part of the board using conventional soldering techniques. The printed wiring board material that defines the electrical conduits, therefore, is situated remotely from the heat conduction path of the heat spreader as thermal energy is transferred from the electronic device through the heat spreader into a heat sink.

Therefore, what is needed is an apparatus and a method providing thermally activated coupling and decoupling multiple heat sinks of the type used in computer systems.

SUMMARY

One embodiment, accordingly, provides a thermally activated device connected to a first heat sink and movable, due to physical distortion resulting from temperature change, to couple and decouple the first heat sink and a second heat sink. To this end, a variable area heat sink includes a first heat sink area and a second heat sink area. A thermally responsive bridge is operable to connect and disconnect the first heat sink area and the second heat sink area.

A principal advantage of this embodiment is that as temperature increases in an operating environment, a first area operating at a first temperature range can be thermally coupled or decoupled as desired, from a second area operating at a second temperature range. Thus, heat sink areas may be enlarged or reduced in size by the coupling or uncoupling.

DETAILED DESCRIPTION OF THE PREFERRED EMBODIMENT

Figure 1:
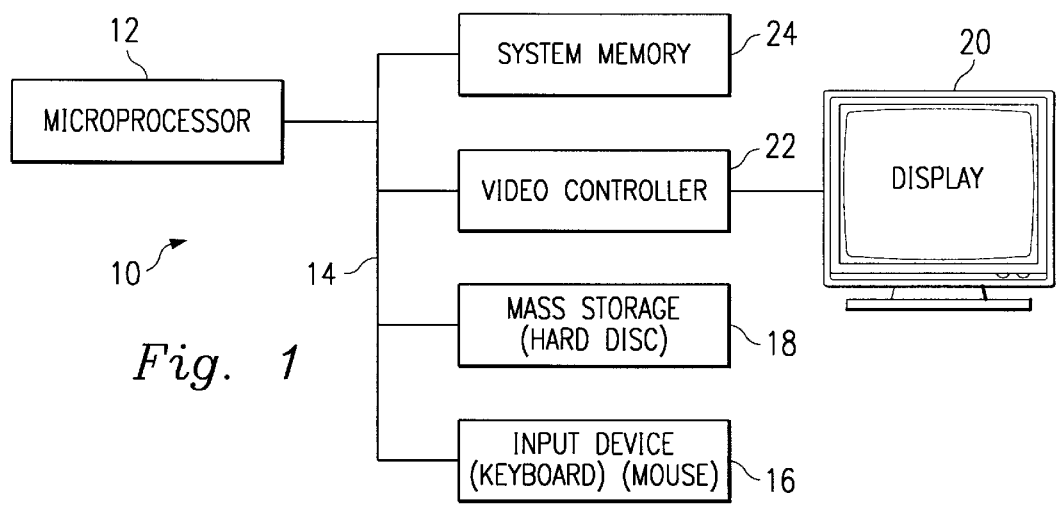
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
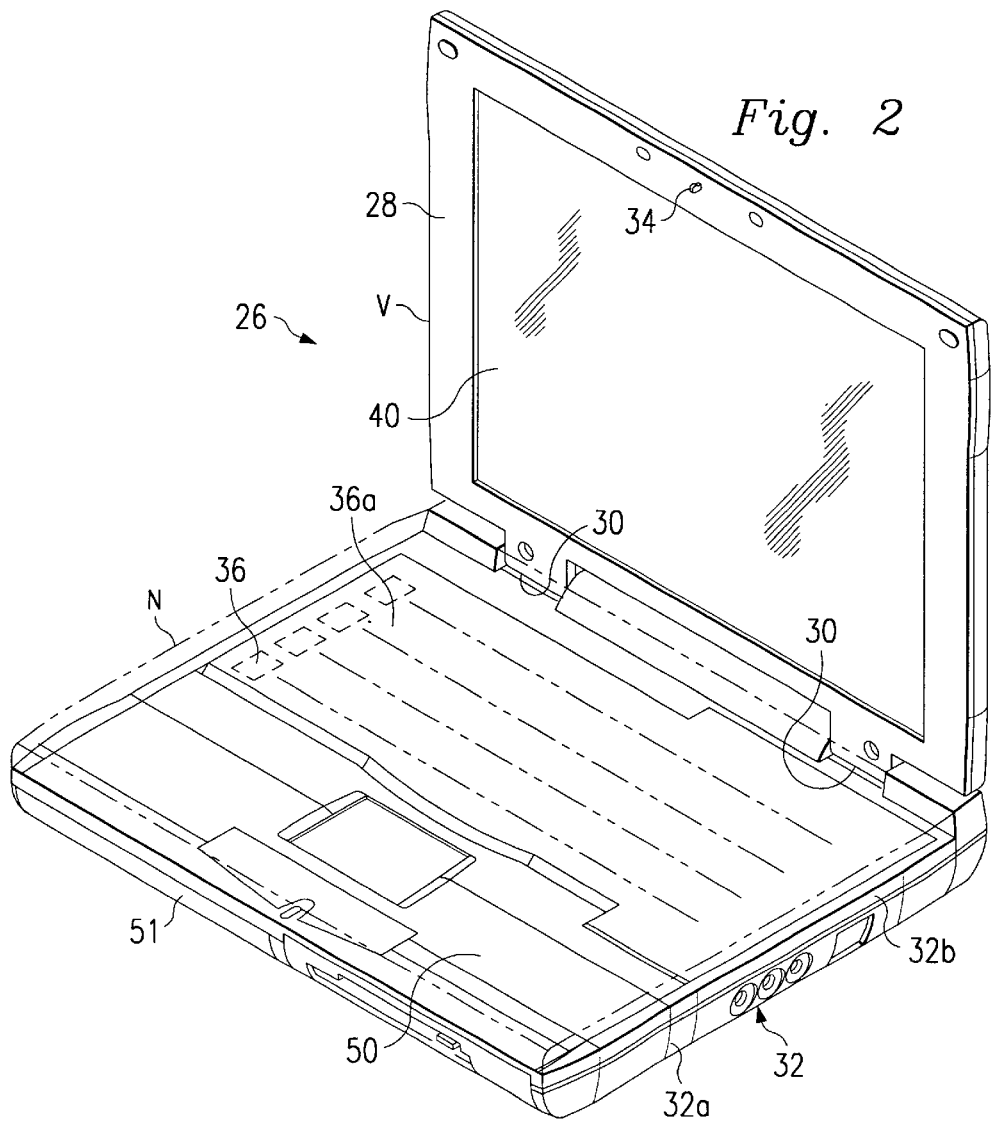
FIG. 2 is a perspective view illustrating an embodiment of a typical portable laptop computer.

Referring to FIG. 2, illustrated is a portable, notebook size computer designated 26 comprising a self-contained system, such as that illustrated at 10 in FIG. 1, and including a hinged top or lid 28 rotatable about a hinge or hinges 30 from a nested position "N," with a horizontal chassis base 32, to a substantially vertical or open position "V". Opening of the notebook style portable computer by manipulation of a latch 34, reveals a plurality of keys 36 on base 32, and a monitor screen 40 mounted in lid or top 28. Base 32 includes a bottom or first member 32a and a top or second member 32b. Top member 32b generally comprises a keyboard area 36a including keys 36 and a palm or wrist rest area 50 positioned above a battery housing 51 and adjacent keyboard area 36a.

Figure 3:
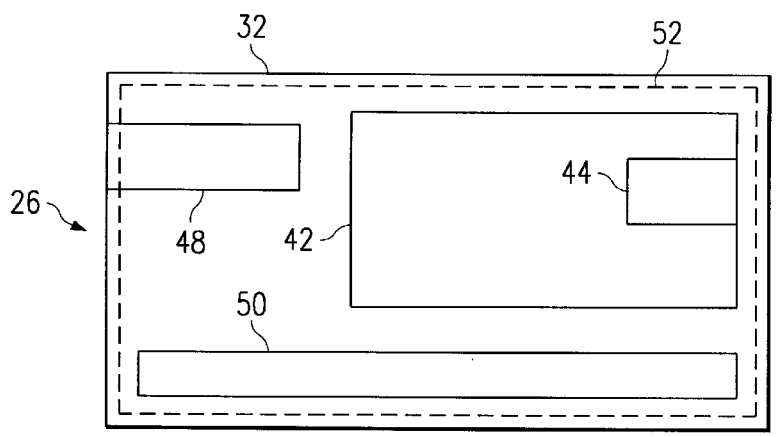
FIG. 3 is a diagrammatic view illustrating a prior art embodiment of a portable computer including a single heat spreader plate.

In FIG. 3, an exemplary diagram of the base 32 of computer 26 illustrates a simplified general layout of some of the components included in base 32. For example, a motherboard 42 includes a processor module 44 which is one of many heat generating components mounted on motherboard 42. Processor module 44 may be specified to operate up to 100° C. at a power level of 12 watts, for example. In another portion of base 32, a heat generating PC card 48 may be inserted into a card slot in base 32. The PC card 48 may be specified to operate up to 55° C. at a power level of 3 watts, for example. In still another portion of base 32, palm rest or wrist rest area 50 is provided for use by a user to rest his or her palm or wrist while keys 36, FIG. 2, are manipulated by the user's fingers. Keys 36 are positioned above processor module 44, FIG. 3, PC card 48, and many other heat generating components (not shown) which are mounted in base 32. Palm or wrist rest area 50 is typically positioned above battery housing 51, FIG. 2, in base 32.

As a result of this construction, the example described clearly illustrates that significant heat is generated by various components in base 32 and, in accordance with the known laws of physics, the generated heat will equalize with its surroundings and external environment and will therefore have an effect on the top member 32b of the base 32, such as the area of keys 36 and the palm or wrist rest area 50. In order to remove some of the heat from base 32, an aluminum heat spreader plate 52, FIG. 3, illustrated in phantom outline, is usually positioned between the heat generating components and the top surface 32b of base 32, FIG. 2, which includes keys 36 and palm or wrist rest area 50.

A problem arises in that the collective temperature of the heat generating components, in the example just described, may be less than 100° C. but greater than 45° C. or 55° C. While the collective temperature is an acceptable environment for the processor module 44, i.e. less than 100° C., it is not an acceptable environment for either the PC card 48 or the wrist rest area 50, i.e. it will be greater than either 45° C. or 55° C. The passive heat removal system represented by heat spreader plate 52 is complimented in some portable computers by an active heat removal system using a fan (not shown) to draw cooling air across heat sinks and the heat spreader plate mounted within the computer chassis base 32. However, such systems tend to permit heat generated by one component to influence or compound heat generated by other components.

Figure 4:
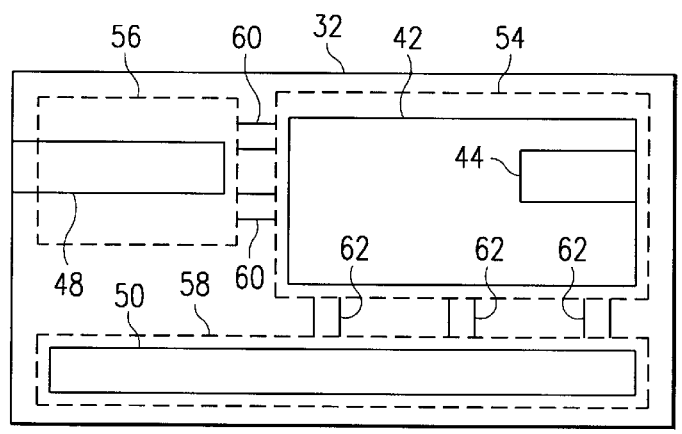
FIG. 4 is a diagrammatic view illustrating an embodiment of a portable computer including a plurality of heat spreader plates connected by a coupling device.

In order to avoid unacceptable temperature conditions of this nature, single heat spreader plate 52, FIG. 3, is replaced by a variable area heat sink in the form of separate aluminum heat spreader plates 54, 56, 58, FIG. 4, respectively positioned adjacent processor module 44, PC card 48 and wrist rest 50. The separate plates 54, 56, 58 may be thermally coupled and uncoupled. By way of example, plate 54 is coupled to plate 56 by a plurality of thermal bridges 60, and plate 54 is coupled to plate 58 by a plurality of thermal bridges 62. In this example, each of the thermal bridges 60, 62 is identical and therefore only one is described in detail.

Figure 5:
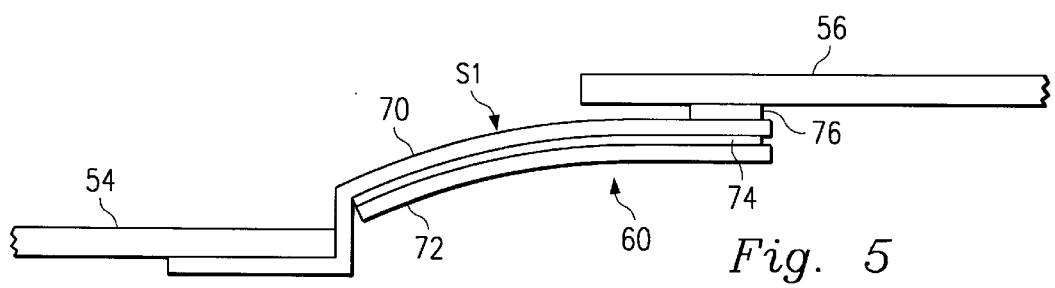
FIG. 5 is a diagrammatic view illustrating an embodiment of a bimetallic coupling device coupling first and second heat spreader plates together.

Thermal bridge 60, FIG. 5 generally comprises a strip of aluminum 70 and an adjacent strip of copper 72. Thus, aluminum strip 70 and copper strip 72 are in a side-by-side relationship. Preferably, the strips 70 30 and 72 are attached to one another by a suitable shear carrier adhesive 74, such as a commercially available epoxy, to limit a lateral shift between aluminum strip 70 and copper strip 72. Also, a mechanical means such as roll bonding would achieve the same effect in a mass production environment. In the area where coupling or contact occurs between bridge 60 and plate 56, a compliant interface material 76 is used to improve surface contact where bridge 60 thermally couples plate 54 and plate 56, or where bridge 62 thermally couples plate 54 to plate 58. A slight contact pressure is desirable at room temperature. Such compliant materials include the product Thermagon, T-pli 200, manufactured by the Thermagon Co. of Cleveland, Ohio, or the product Cho-therm, manufactured by Chothermics, a division of Parker Hannifin, PLC, of Woburn, Mass. An increased temperature of plate 54 conducts heat to aluminum strips 70 and causes a corresponding increase in the temperature of bridge 60.

Figure 6:
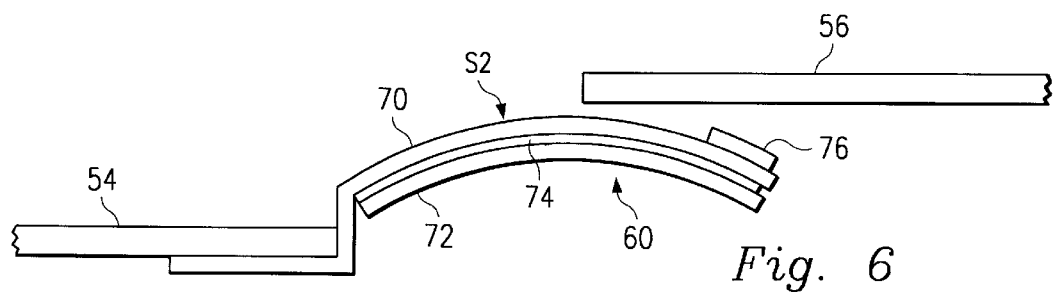
FIG. 6 is a diagrammatic view illustrating an embodiment of the bimetallic coupling device of FIG. 5 distorted by a temperature change sufficient to decouple the first and second heat spreader plates.

The different coefficients of linear expansion between aluminum strip 70 and copper strip 72, causes the bridge 60 to distort so as to bend or deform from a first shape S1, FIG. 5, to a second shape S2, FIG. 6, toward the copper strip 72, FIG. 6, thus decoupling plates 54 and 56, FIG. 4.

Both the copper material and aluminum material are highly thermally conductive and a large bonding area across the interface between aluminum strip 70 and copper strip 72 helps limit heat losses across that interface. It has been found that significant contact forces can be developed between bridge 60 and an adjacent plate 56, and large controllable deflections are possible. For example, in one experiment, an interface 5 cm in length and 0.5 mm in thickness deflected 13 mm at the tip when subjected to a 30° C. temperature change. This structure applied a 12 pound contact force prior to deflection.

It should be readily apparent that the bridge described may be used to deflect into contact with an adjacent plate as well as deflect out of contact as described above. That is, the deflection may be used to thermally couple and/or to thermally decouple adjacent heat spreader plates. Also, other bimetallic materials may be used. In addition, through variations in bimetallic contact areas and bimetallic materials, an arrangement of plural adjacent plates may be sequentially coupled and/or decoupled at selected temperatures such as the plates 54, 56 58, illustrated in FIG. 4, in which plates 54 and 56 are coupled by bridges 60 and plates 54 and 58 are coupled by bridges 62.

In operation, plates 54 and 56 are thermally coupled by bridges 60, and plates 54 and 58 are thermally coupled by bridges 62, FIG. 4. When computer 26 is activated by a user, electrical components, including processor module 44 and PC card 48, begin to generate heat which is conducted to plates 54, 56 and 58 due to the interconnection or thermal coupling by bridges 60 and 62. As the combined temperatures of the plates 54, 56 and 58 reach 45° C., bridges 62 are constructed to decouple plate 58 from plate 54 so that the touch comfort level of the wrist rest area 50 is not exceeded due to heat generated by processor module 44. In addition, as the combined temperature of plates 54 and 56 reach 55° C., bridges 60 are constructed to decouple plate 56 from plate 54 so that the specified thermal operating limit of PC card 48 is not exceeded due to heat generated by processor module 44. An active thermal solution, i.e. a fan or the like, may be used to assist in maintaining the processor module 44 and heat spreader plate area 54 within acceptable operating limits.

As it can be seen, the principal advantage of these embodiment are that a series of heat sinks and their respective components can be sequentially thermally coupled and decoupled as changes in temperature occur in an operating environment such as a computer system, or in many other such applications. By variations in the bimetallic strips, deformation of the thermal bridge can be controlled to either couple or decouple adjacent heat sinks as desired.

As a result, one embodiment provides a variable area heat sink comprising a first heat sink area, a second heat sink area separated from the first heat sink area, and a thermally responsive bridge operable to connect and disconnect the first heat sink area and the second heat sink area.

Another embodiment provides a variable area heat sink comprising a first heat sink area, a second heat sink area, and abridge operable to connect and disconnect the first heat sink area and the second heat sink area in response to a temperature change in the bridge sufficient to distort the bridge from a first shape to a second shape.

A further embodiment provides a computer comprising a chassis, a first heat producing component mounted in the chassis adjacent a first heat sink area, a second heat producing component mounted in the chassis adjacent a second heat sink area separated from the first heat sink area, and a bridge operable to connect and disconnect the first heat sink area and the second heat sink area in response to a temperature change in the bridge.

A still further embodiment provides a computer system comprising a microprocessor, an input coupled to provide input to the microprocessor, a mass storage coupled to the microprocessor, a display coupled to the microprocessor by a video controller, a memory coupled to provide storage to facilitate execution of computer programs by the microprocessor, a chassis for housing the computer system, a first heat producing component mounted in the chassis adjacent a first heat sink area, a second heat producing component mounted in the chassis adjacent a second heat sink area separated from the first heat sink area, and a thermally responsive bridge operable to connect and disconnect the first heat sink area and the second heat sink area.

An even further embodiment includes a method for providing a variable heat sink area in a computer comprising the steps of mounting a first heat producing component in a chassis of the computer adjacent a first heat sink area, mounting a second heat producing component in the chassis adjacent a second heat sink area separated from the first heat sink area, attaching a bimetallic, thermally responsive bridge to the first heat sink area, the bridge being operable to thermally couple and decouple the first heat sink area and the second the sink area, and exposing the bridge to a temperature change sufficient to distort the bimetallic elements of the bridge from a first shape to a second shape.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A variable are a heat sink comprising:

a first heat sink area;

a second heat sink area separated from the first heat sink area;

a third heat sink area separated from the first and second heat sink areas;

a first thermally responsive bridge thermally coupling the first heat sink area and the second heat sink area, the first bridge including a first metallic member adhered to an adjacent second metallic member, the first bridge thermally decoupling the first and second heat sink areas in response to the first, second and third heat sink areas having a combined first temperature higher than the temperature of the first heat sink area; and a second thermally responsive bridge thermally coupling the second heat sink area and the third heat sink area, the second bridge including a first metallic member adhered to an adjacent second metallic member, the second bridge thermally decoupling the second and third heat sink areas in response to the second and third heat sink areas having a combined second temperature, greater than the first temperature.

2. The heat sink as defined in claim 1 wherein the first metallic member is adhered to the second metallic member by a shear carrier adhesive so that the first and second metallic members cannot shift laterally with respect to each other.

3. The heat sink as defined in claim 1 wherein the first metallic member is formed of aluminum and the second metallic member is formed of copper.

4. The heat sink as defined in claim 1 wherein the bridge distorts from a first shape to a second shape in response to a temperature change in the bridge.

5. A variable area heat sink comprising:

a first heat sink area;

a second heat sink area thermally coupled to the first heat sink area;

a third heat sink area thermally coupled to the second heat sink areas;

first means for thermally decoupling the first heat sink area and the second heat sink area in response to the first, second and third heat sink areas having a combined first temperature higher than the temperature of the first heat sink area, the first means including a bridge having a first metallic member adhered to an adjacent second metallic member; and second means for thermally decoupling the second heat sink area and the third heat sink area in response to the second and third heat sink areas having a combined second temperature, greater than the first temperature, the second means including a bridge having a first metallic member adhered to an adjacent second metallic member.

6. The heat sink as defined in claim 5 wherein the first metallic member is adhered to the second metallic member by a shear carrier adhesive so that the first and second metallic members cannot shift laterally with respect to each other.

7. The heat sink as defined in claim 5 wherein the first metallic member is formed of aluminum and the second metallic member is formed of copper.

8. A computer comprising:

a chassis;

a first heat producing component mounted in the chassis adjacent a first heat sink area;

a second heat producing component mounted in the chassis adjacent a second heat sink area separated from the first heat sink area;

a third heat sink area adjacent to and separated from the first and second heat sink areas;

a first bridge operable to thermally decouple the first heat sink area and the second heat sink area in response to the first, second and third heat sink areas having a combined first temperature higher than the temperature of the first heat sink area; and a second bridge operable to thermally decouple the second heat sink area and the third heat sink area in response to the second and third heat sink areas having a combined second temperature, greater than the first temperature.

9. The computer system as defined in claim 8 wherein the first metallic member is adhered to the second metallic member by a shear carrier adhesive so that the first and second metallic members cannot shift laterally with respect to each other.

10. The computer system as defined in claim 8 wherein the first metallic member is formed of aluminum and the second metallic member is formed of copper.

11. The computer system as defined in claim 8 wherein the bridge distorts from a first shape to a second shape in response to a temperature change in the bridge.

12. A computer system comprising:

a microprocessor;

an input coupled to provide input to the microprocessor;

a mass storage coupled to the microprocessor;

a video controller coupled to the microprocessor;

a memory coupled to provide storage to facilitate execution of computer programs by the microprocessor;

a chassis for housing the computer system;

a first heat producing component mounted in the chassis adjacent a first heat sink area;

a second heat producing component mounted in the chassis adjacent a second heat sink area separated from the first heat sink area;

a third heat sink area adjacent to and separated from the first and second heat sink areas;

a first thermally responsive bridge thermally coupling the first heat sink area and the second heat sink area, the first bridge including a first metallic member adhered to an adjacent second metallic member, the first bridge thermally decoupling the first and second heat sink areas in response to the first, second and third heat sink areas having a combined first temperature higher than the temperature of the first heat sink area; and a second thermally responsive bridge thermally coupling the second heat sink area and the third heat sink area, the second bridge including a first metallic member adhered to an adjacent second metallic member, the second bridge thermally decoupling the second and third heat sink areas in response to the second and third heat sink areas having a combined second temperature, greater than the first temperature.

13. The computer system as defined in claim 12 wherein the first metallic member is adhered to the second metallic member by a shear carrier adhesive so that the first and second metallic members cannot shift laterally with respect to each other.

14. The computer system as defined in claim 12 wherein the first metallic member is formed of aluminum and the second metallic member is formed of copper.

15. The computer system as defined in claim 12 wherein the bridge distorts from a first shape to a second shape in response to a temperature change in the bridge.

\* \* \* \* \*